United States Patent [19]

Ukani et al.

[11] Patent Number: 5,760,990
[45] Date of Patent: Jun. 2, 1998

[54] SERVO POSITION ERROR SIGNAL CALIBRATION IN A HARD DISC DRIVE

[75] Inventors: Anish A. Ukani, Oklahoma City; Lealon R. McKenzie, Edmond; Daniel E. Hobson, Yukon, all of Okla.

[73] Assignee: Seagate Technology, Inc., Scotts Valley, Calif.

[21] Appl. No.: 652,323

[22] Filed: May 21, 1996

Related U.S. Application Data

[60] Provisional application No. 60/002,047, Aug. 8, 1995.
[51] Int. Cl.$^6$ .................................. G11B 5/596
[52] U.S. Cl. .................. 360/77.04; 360/77.02; 360/77.08
[58] Field of Search ................. 360/77.08, 77.02, 360/77.04, 77.05

[56] References Cited

U.S. PATENT DOCUMENTS

| | | |
|---|---|---|
| 5,136,439 | 8/1992 | Weispfenning et al. |
| 5,170,299 | 12/1992 | Moon ................................ 360/77.08 |
| 5,210,662 | 5/1993 | Nishijima ......................... 360/77.04 |
| 5,262,907 | 11/1993 | Duffy et al. |

*Primary Examiner*—Aristotelis M. Psitos
*Assistant Examiner*—James L. Habermehl
*Attorney, Agent, or Firm*—Bill D. McCarthy; Edward P. Heller, III; Randall K. McCarthy

[57] ABSTRACT

A method for calibrating the position error signal in a servo system of a disc drive. The disc drive comprises a disc and an actuator adjacent the disc, the actuator including a head which is controllably positionable relative to data tracks on the surface of the disc using a servo position error signal generated using a scale factor generally indicative of the ratio of the width of the head to the width of the tracks on the disc. The head is positioned at the center of a selected track using an initial scale factor for the position error signal, the selected track having servo position fields comprising a plurality of burst patterns. The burst patterns include a first burst pattern extending radially from a first track boundary to a second track boundary of the selected track, a second burst pattern extending radially from the center of the selected track to the first track boundary and a third burst pattern extending radially from the center of the selected track to the second track boundary. At the center of the selected track, the magnitude of burst signals read by the head from the second and third burst patterns is nominally equal, and from this location the head is swept towards the first track boundary until the magnitude of burst signals from the second burst pattern is nominally equal to the magnitude of burst signals from the first burst pattern, identifying a quarter-track location halfway between the center of the selected track and the first track boundary. A calibration scale factor for the position error signal is determined from the ratio of the expected position error signal to the actual position error signal obtained at the quarter-track location. Alternatively, the initial scale factor is incremented and the head is repositioned towards until the quarter-track location until the magnitude of burst signals from the second burst pattern is nominally equal to the magnitude of burst signals from the first burst pattern, after which the incremented scale factor is stored as the calibration scale factor.

7 Claims, 5 Drawing Sheets

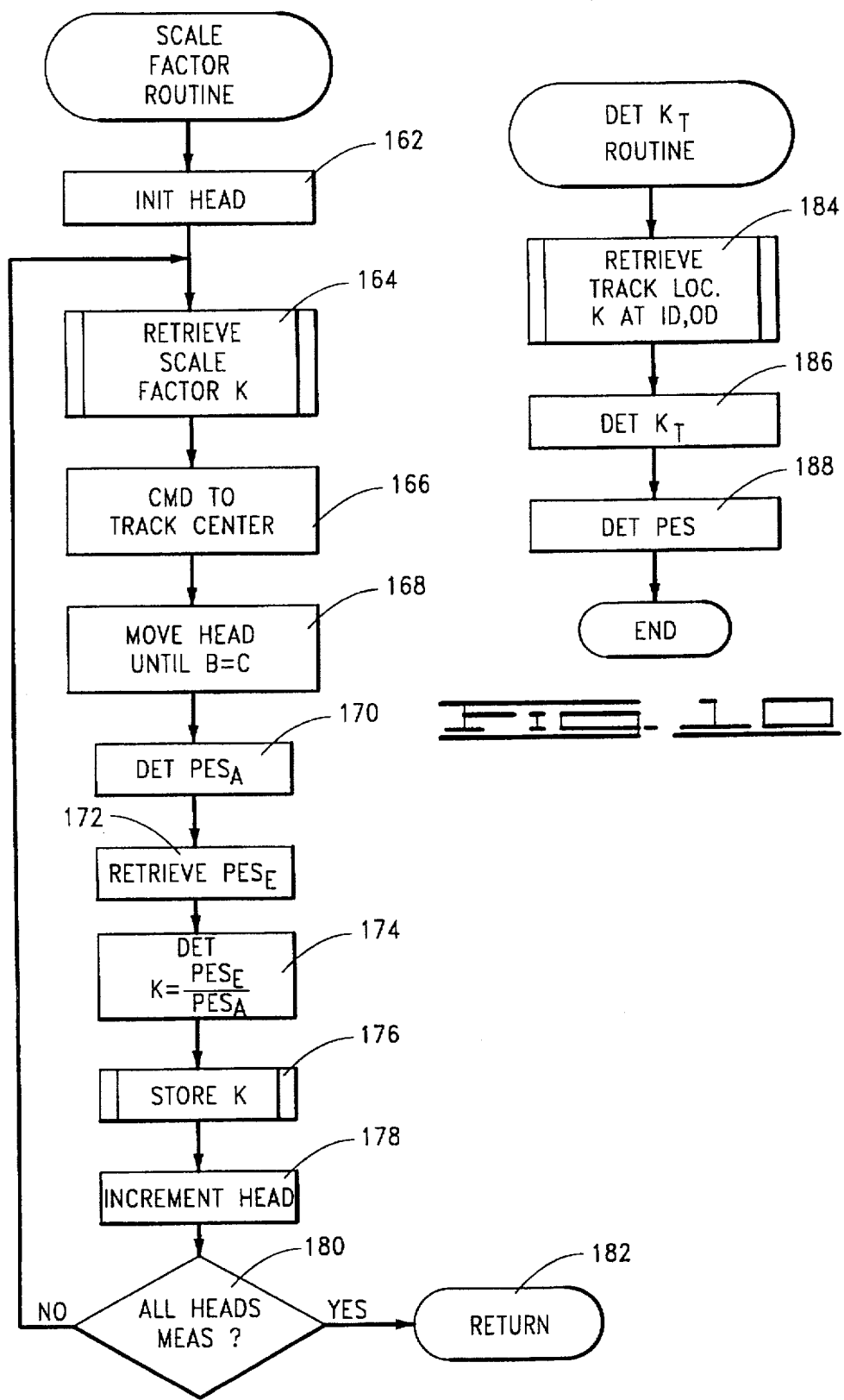

SERVO POSITION ERROR SIGNAL CALIBRATION IN A HARD DISC DRIVE

CROSS-REFERENCE TO RELATED APPLICATION

This application is a continuation-in-part of, and claims priority to, Provisional Application Ser. No. 60/002,047, filed Aug. 8, 1995 and incorporated herein by reference.

BACKGROUND OF THE INVENTION

1. Field of the Invention

This invention relates generally to the field of disc drive data storage devices, and more particularly, but not by way of limitation, to a method for calibrating the position error signal in a hard disc drive servo system.

2. Discussion

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from a substantially cylindrical actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of an array of permanent magnets. When controlled DC current is passed through the coil, an electromagnetic field is set up which interacts with the magnetic field of the magnets and causes the coil to move in accordance with the well-known Lorenz relationship. As the coil moves relative to the magnets, the actuator body pivots about the pivot shaft and the heads are moved across the disc surfaces.

Typically, the heads are supported over the discs by actuator slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of data track and converts these to a signal which is decoded by read channel circuitry of the disc drive.

Control of the position of the heads is typically achieved with a closed loop servo system such as disclosed in U.S. Pat. No. 5,262,907 entitled HARD DISC DRIVE WITH IMPROVED SERVO SYSTEM, issued to Duffy et al., assigned to the assignee of the present invention and incorporated herein by reference. In such a system, head position (servo) information is prerecorded on at least one surface of the discs. The servo system can be a "dedicated" servo system, in which one entire disc surface is prerecorded with the servo information and a corresponding dedicated servo head is used to provide essentially continuous servo position information to the servo system. Alternatively, an "embedded" servo system can be implemented in which servo information is interleaved with user data and intermittently read by the same heads used to read and write the user data.

With either a dedicated or embedded servo system, it is common to generate a position error signal (PES) which is indicative of the position of the head with respect to the center of a particular track. Particularly, during track following, the servo system generates the PES from the received servo information and then uses the PES to generate a correction signal which is provided to a power amplifier to control the amount of current through the actuator coil, in order to adjust the position of the head accordingly.

Typically, the PES is presented as a position dependent signal having a magnitude indicative of the relative distance between the head and the center of a track and a polarity indicative of the direction of the head with respect to the track center. Thus, it is common for the PES to have values ranging from, for example, $-0.5$ to $+0.5$ as the head sweeps across the track and to have a value of 0 when the head is centered on the track. It will be recognized that the PES is generated by the servo system by comparing the relative signal strengths of precisely located magnetized dibits (fields) in the servo information on the disc surface. As discussed more fully in the previously incorporated Duffy et al. U.S. Pat. No. 5,262,907, the fields are generally arranged in an "offset checkerboard" pattern so that, through manipulation of the magnitudes of the read signals provided to the servo system as the dibits are read, the relative position of the head to a particular track center can be determined (and subsequently controlled). Of course, in digital servo systems the PES is generated as a sequence of digital values over a selected range, with the digital value at any particular sample time indicative of the relative position of the head with respect to a selected track.

The continuing trend in the disc drive industry is to develop products with ever increasing areal densities (greater than 1 Gbit/in$^2$) and decreasing access times (less than 10 ms). As this trend continues, greater demands are being placed on the ability of modern servo systems to control the position of data heads with respect to data tracks. One problem that results with such increased demand in disc drive performance is maintaining the accuracy of the PES. Particularly, the head detects the magnetization of the servo fields as the head passes over the track and the relative signal strengths read from these servo fields are used in the determination of the PES. Thus, both the width of the head and the width of the track are important factors in generating the PES, as a wider head will generally provide a different set of read signals as compared to a narrower head over the same location of a track. Typically, the PES is calculated using the relative signal strengths from the servo fields, as well as a scale factor representing the ratio of the head width to track width. The scale factor is generally determined during the manufacturing of the disc drive using nominal values for the head and track width.

However, it has been found that track width may vary over the radius of the disc and from drive to drive and such variation becomes increasingly significant as areal densities continue to increase. Particularly, certain disc drives have been found to have narrower tracks at the outer diameter than at the inner diameter of the discs. Likewise, a nominal amount of variation in the width of heads is typically present as a result of manufacturing tolerances inherent in the large-scale manufacturing of disc drives. Additionally, off-

3 sets can exist in the servo loop which affect the determination of the PES.

As a result of these and other variances, using a scale factor determined from nominal values for the head and track width may not accurately reflect the relationship of the head width to the track width for a selected track. This can cause inaccuracies in the generation and use of the PES, providing a degree of instability in the servo loop. Thus, there is a need for an improved approach to calibrating the PES to take into account variations from nominal track and head widths as well as the effects of offsets in the servo loop in order to improve the servo positioning accuracy of the disc drive servo system.

SUMMARY OF THE INVENTION

The present invention provides a method for calibrating the position error signal in a servo system of a disc drive. The disc drive comprises a disc and an actuator adjacent the disc, the actuator including a head which is controllably positionable relative to data tracks on the surface of the disc using a servo position error signal generated using a scale factor generally indicative of the ratio of the width of the head to the width of the tracks on the disc.

In accordance with the method of the present invention, the head is positioned at the center of a selected track using an initial scale factor for the position error signal, the selected track having servo position fields comprising a plurality of burst patterns. The burst patterns include a first burst pattern extending radially from a first track boundary to a second track boundary of the selected track, a second burst pattern extending radially from the center of the selected track to the first track boundary and a third burst pattern extending radially from the center of the selected track to the second track boundary.

At the center of the selected track, the magnitude of burst signals read by the head from the second and third burst patterns is nominally equal, and from this location the head is positioned towards the first track boundary until the magnitude of burst signals from the second burst pattern is nominally equal to the magnitude of burst signals from the first burst pattern, identifying a quarter-track location halfway between the center of the selected track and the first track boundary. A calibration scale factor for the position error signal is determined from the ratio of the expected position error signal to the actual position error signal obtained at the quarter-track location. Alternatively, the initial scale factor is incremented and the head is repositioned towards the quarter-track location until the magnitude of burst signals from the second burst pattern is nominally equal to the magnitude of burst signals from the first burst pattern, after which the incremented scale factor is stored as the calibration scale factor.

An object of the present invention is to improve servo positioning accuracy in a disc drive.

Another object is to account for variations in head and track width in disc drives in the generation of a position error signal.

Yet another object is to identify a calibration scale factor used in the generation of the position error signal for a selected calibration track and to subsequently use the calibration scale factor to identify an appropriate scale factor for generation of the position error signal for any selected track on the discs of the disc drive.

Other object, advantages and features of the present invention will be apparent from the following description when read in conjunction with the drawings and appended claims.

4

BRIEF DESCRIPTION OF THE DRAWINGS

FIG. 9 shows an alternative generalized flow chart for the scale factor routine of FIG. 7.

FIG. 10 provides a subsequent routine used by the disc drive to generate an appropriate scale factor for the position error signal for a selected track of the disc drive, in accordance with calibration scale factors identified during the operation of the routines of FIGS. 7-9.

DETAILED DESCRIPTION OF THE PREFERRED EMBODIMENT

Figure 1:
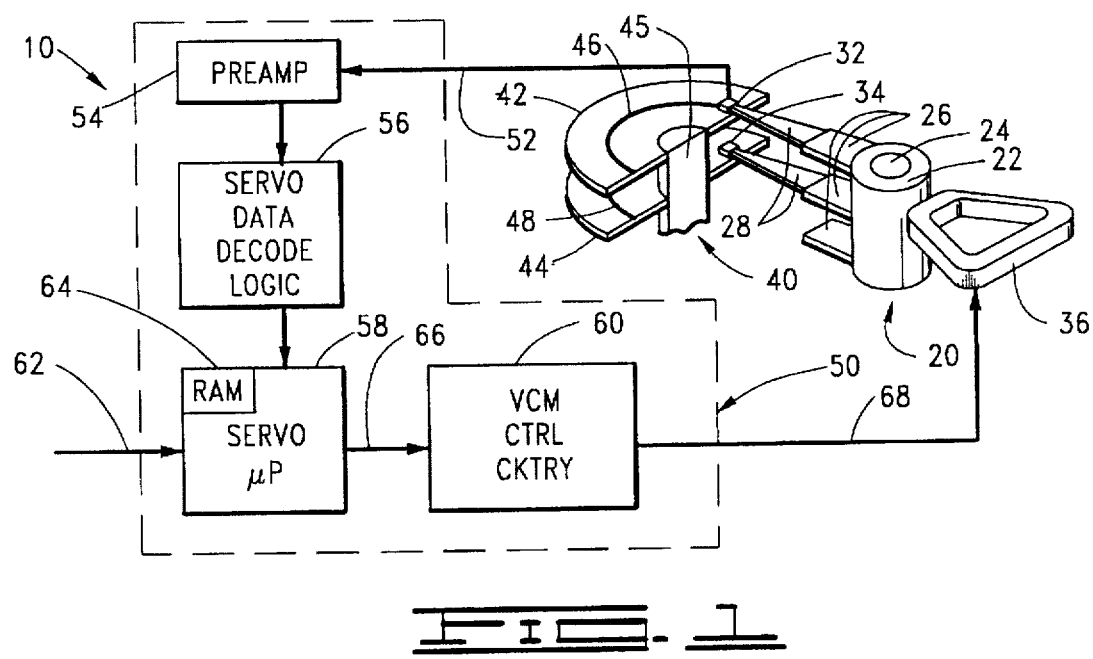
FIG. 1 is a functional block representation of a servo system for a disc drive of the present invention.

Turning now to the drawings and more particularly to FIG. 1, shown therein is a functional block representation of a servo system for a disc drive (generally denoted as 10) of the present invention. More particularly, FIG. 1 shows the disc drive 10 to include an actuator assembly 20, a disc assembly 40 and a servo loop 50, with the servo loop 50 operably controlling radial position of the actuator assembly 20 with respect to the disc assembly 40.

The actuator assembly 20 comprises an actuator body 22 that pivots about a pivot shaft 24. The actuator body 22 includes arms 26 that extend radially as shown from the actuator body 22, and flexures 28 which extend from each of the arms 26. Mounted at the distal end of each of the flexures 28 is a head (two shown in FIG. 1 at 32 and 34, respectively). Additionally, an actuator coil 36 is mounted to the actuator body 22 opposite the arms 26. The coil 36 is part of a conventional voice coil motor (VCM) comprising the coil 36 as well as a pair of permanent magnets (not shown) located above and below the coil 36, so that the coil 36 moves through the magnetic field established by these magnets as the actuator body 22 pivots about the pivot shaft 24.

The disc assembly 40 comprises a plurality of discs (two shown in FIG. 1 as 42 and 44, respectively) mounted to a hub 45 for rotation at a constant high speed by a conventional spindle motor (not shown). The surfaces of the discs 42 and 44 comprise a plurality of radially concentric tracks (two shown at 46 and 48, respectively).

It will be recognized that in a typical disc drive there will be one head per disc surface, but for purposes of clarity only two heads 32, 34 have been shown in FIG. 1 and these heads 32, 24 correspond to the top surfaces of the discs 42 and 44. It will further be recognized that servo information will be prerecorded on at least one of the surfaces of the discs 42, 44 to provide the requisite servo positioning information to the servo loop 50. As provided hereinabove, in a dedicated servo system one surface of one disc is designated as a dedicated servo surface (such as the top surface of the disc 42) so that servo information is prerecorded on all of the tracks (including track 46) and user data is stored on the remaining disc surfaces (such as on track 48 of the disc 44). In such a case the head 32 would be a servo head and the head 34 would be a data head. Alternatively, in an embedded servo system, the servo information is intermittently prerecorded on all of the tracks, so that each of the tracks 46 and 48 would contain both servo information and user data and the heads 32 and 34 would operate as both servo and data heads. The present invention is not dependent upon the type of servo system implemented; however, for purposes of clarity it is contemplated that at least track 46 includes servo information that is read by the head 32 and provided to the servo loop 50.

The servo loop 50 receives the servo information from the head 32 on signal path 52 and this servo information is amplified by a preamp circuit 54 and provided to servo data decode logic circuitry 56. The servo data decode logic circuitry 56 includes an analog to digital converter (ADC) so that selected digital representations of the servo information are provided to a servo microprocessor 58. The servo microprocessor 58 generates the aforementioned PES from the servo information and uses the PES to generate and output a correction signal to VCM control circuitry 60. The servo microprocessor 58 determines the correction signal in accordance with commands received by a disc drive system microprocessor (not shown) by way of signal path 62 and programming steps stored in servo RAM 64. The correction signal is provided by way of signal path 66 to the VCM control circuitry 60, which includes a power amplifier (not shown) that outputs a controlled dc current of a selected magnitude and polarity to the coil 36 by way of signal path 68 in response to the correction signal. Thus, during track following mode, the servo information indicates the relative position error of the head 32 with respect to the center of the track 46 and the correction signal causes a correction in the dc current applied to the coil 36 in order to compensate for this position error and move the head 32 to the center of the track 46. A detailed discussion of the construction and operation of the servo loop 50 can be found in the previously incorporated Duffy et al. reference, U.S. Pat. No. 5,262,907 as well as U.S. Pat. No. 5,136,439 entitled SERVO POSITION DEMODULATION SYSTEM, issued Aug. 4, 1992 to Weispfenning et al., assigned to the assignee of the present invention and incorporated herein by reference.

Figure 2:
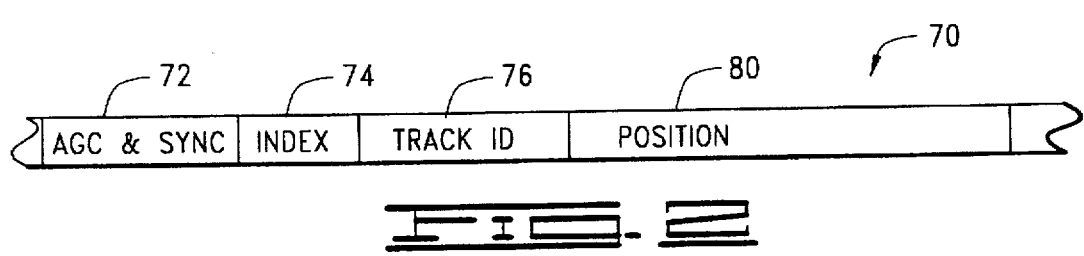
FIG. 2 provides a representation of the general format of a servo frame of the disc drive of FIG. 1.

As will be recognized, the servo information is recorded during the manufacturing of the disc drive 10 using a highly precise servo writer. The servo information serves to define the boundaries of each of the tracks and is divided circumferentially into a number of frames. The general format of one such frame 70 is shown in FIG. 2. More particularly, FIG. 2 shows the frame 70 to comprise a plurality of fields, including an AGC & Sync field 72, an index field 74, a track ID field 76 and a position field 80. Of particular interest is the position field 80, but for purpose of clarity it will be recognized that the AGC & Sync field 72 provides input for the generation of timing signals used by the disc drive 10, the index field 74 indicates radial position of the track and the track ID field 76 provides the track address. Of course, additional fields may be used as desired and the format of the fields in a servo frame will depend upon the construction of a particular disc drive; for more detailed discussion of typical servo fields see the previously incorporated Duffy et al. U.S. Pat. No. 5,262,907 and Weispfenning et al. U.S. Pat. No. 5,136,439 references.

Figure 3:
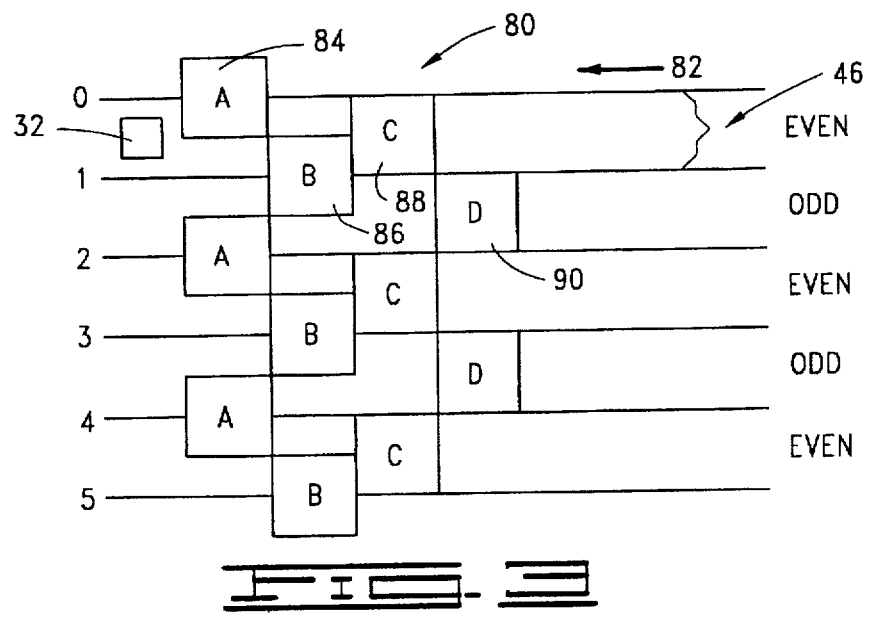
FIG. 3 shows the four position burst fields of the servo frame of FIG. 2.

The position field 80 comprises four position burst fields arranged in an offset, quadrature pattern for a plurality of adjacent tracks, as shown in FIG. 3. More particularly, FIG. 3 shows the position field 80 to comprise burst patterns A, B, C and D having selected geometries and magnetization vectors, defining a plurality of track boundaries identified from 0 to 5. Thus, each track comprises the area bounded by two adjacent track boundaries (e.g., the track 46 of FIG. 1 is represented in FIG. 3 to be bounded by the track boundaries 0 and 1). Additionally, the head 32 of FIG. 1 is represented in FIG. 3 as being centered on the track 46. The direction of rotation of the disc assembly 40 (and hence the position field 80) relative to the head 32 is indicated by arrow 82.

Both the A and B burst patterns are shown to extend from the center of one track to the center of an immediately adjacent track, with these patterns offset in a "checkerboard" fashion. Additionally, the C and D burst patterns extend from one track boundary to the next track boundary, with these patterns also offset as shown. Thus, as the head 32 passes over the position field 80 on track 46, the head 32 will pass over portions of the A and B burst patterns (identified as 84 and 86, respectively) and then over C burst pattern 88. However, the head 32 will not encounter D burst pattern 90, as this pattern is on an adjacent track. For reference, tracks having C burst patterns are referred to as "even tracks" and tracks with D burst patterns are referred to as "odd tracks". Hence, track 46 is an even track.

Generally, it will be recognized that when the head 32 is "centered" on the mid-point of track 46, the amplitude of an A burst signal induced by the head 32 by the A burst pattern 84 will be equal to the amplitude of a B burst signal induced in the head by the B burst pattern 86. Moreover, the amplitude of a C burst signal induced by the C burst patter 88 will have a maximum value and the amplitude of a D burst signal from the D burst pattern 90 will be nominally zero. Further, when the head 32 is positioned over the track boundary 1, the amplitudes of the C and D burst signals from the patterns 88 and 90 will be equal in magnitude, the B burst signal from the pattern 86 will have a maximum value and the A burst from the pattern 84 will be zero. Thus, as the head 32 is swept from one track boundary to the next, the amplitudes of the A, B, C and D burst signals cycle between zero and maximum values, as illustrated by FIG. 4.

Figure 4:
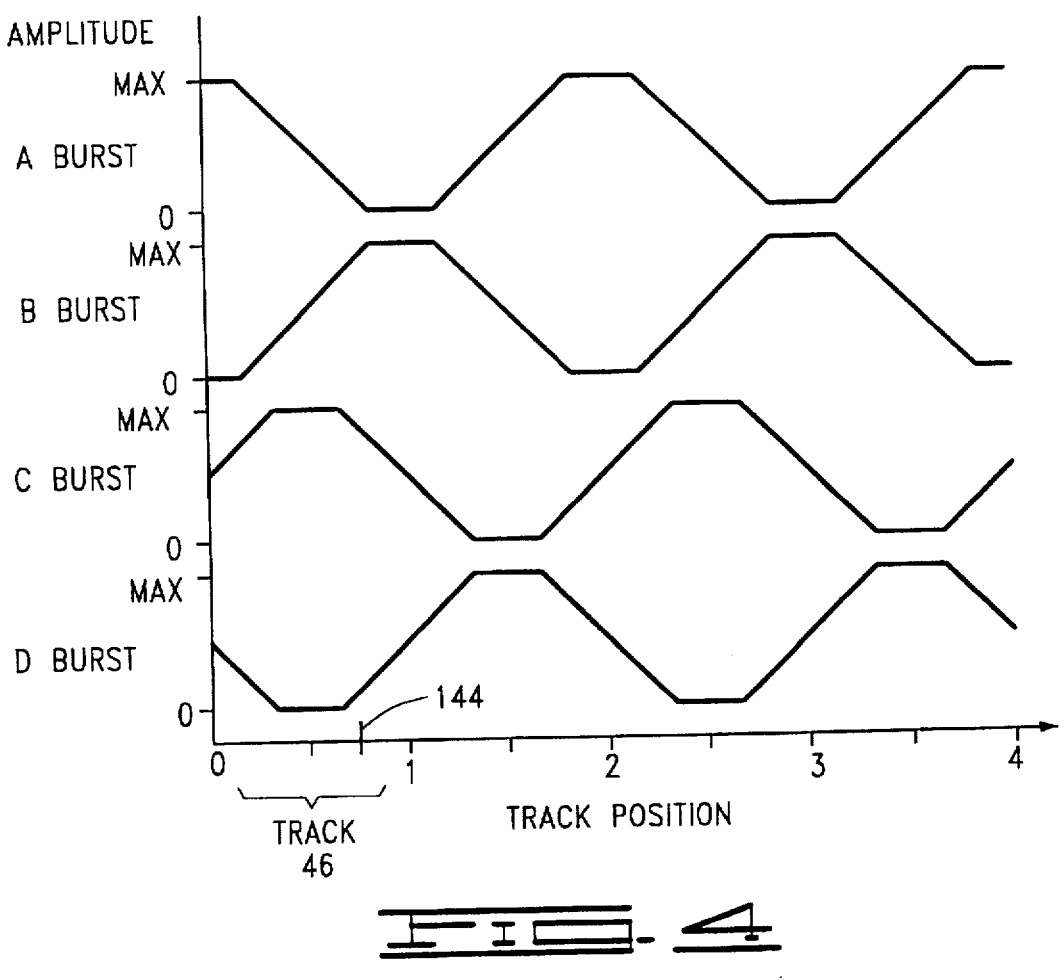
FIG. 4 provides a graphical representation of the amplitudes of the A, B, C and D burst signals from the four position burst fields of FIG. 3.

FIG. 4 provides a graphical representation of the amplitudes of the A, B, C and D burst signals as the head 32 is moved from track boundary 0 to track boundary 4 in FIG. 3. More particularly, FIG. 4 plots each of the burst signals along a common horizontal axis indicative of radial track position and an aligned vertical axis indicative of the amplitude for each of the burst signals from a value of zero to a maximum value. As in FIG. 3, the track 46 is shown in FIG. 4 to comprise the interval between the values of 0 and 1 on the horizontal axis. It will be recognized that both the A and B burst signals and the C and D burst signals can be viewed as being 180 degrees out of phase, respectively and that the A and B burst signals are offset by 90 degrees from the C and D burst signals, respectively.

As explained more fully hereinbelow, the servo system of FIG. 1 relies on the amplitudes of the A, B, C and D burst signals shown in FIG. 4 to generate the PES, which as provided hereinabove is used to generate the correction signal for controlling the position of the head 32. More particularly, in the practice of the present invention the servo system of FIG. 1 first generates the PES when digital representations of the amplitudes shown in FIG. 4 are provided to the servo microprocessor 58, which determines the following phase values:

$$AmB_n = \frac{(A_n - B_n)(K)}{(A_n + B_n)(2)} \quad (1)$$

$$BmA_n = \frac{(B_n - A_n)(K)}{(A_n + B_n)(2)} \quad (2)$$

$$CmD_n = \frac{(C_n - D_n)(K)}{(C_n + D_n)(2)} \quad (3)$$

$$DmC_n = \frac{(D_n - C_n)(K)}{(C_n + D_n)(2)} \quad (4)$$

where $A_n$, $B_n$, $C_n$ and $D_n$ are the digital representations of the amplitudes of the A, B, C and D burst signals respectively, for each sample n; and K represents a head to track geometric scaling factor determined by:

$$K = \frac{\text{(head width)}}{\text{(track width)}} \quad (5)$$

The PES comprises a composite of selected portions of the four phase values defined by equations (1)–(4); that is, depending upon the relative position of the head with respect to the track and the track type (even or odd), one of the four phase values will be selected as the value of the PES (this is explained more fully hereinbelow). Initially, however, the general shape of the composite PES is shown in FIG. 5.

Figure 5:
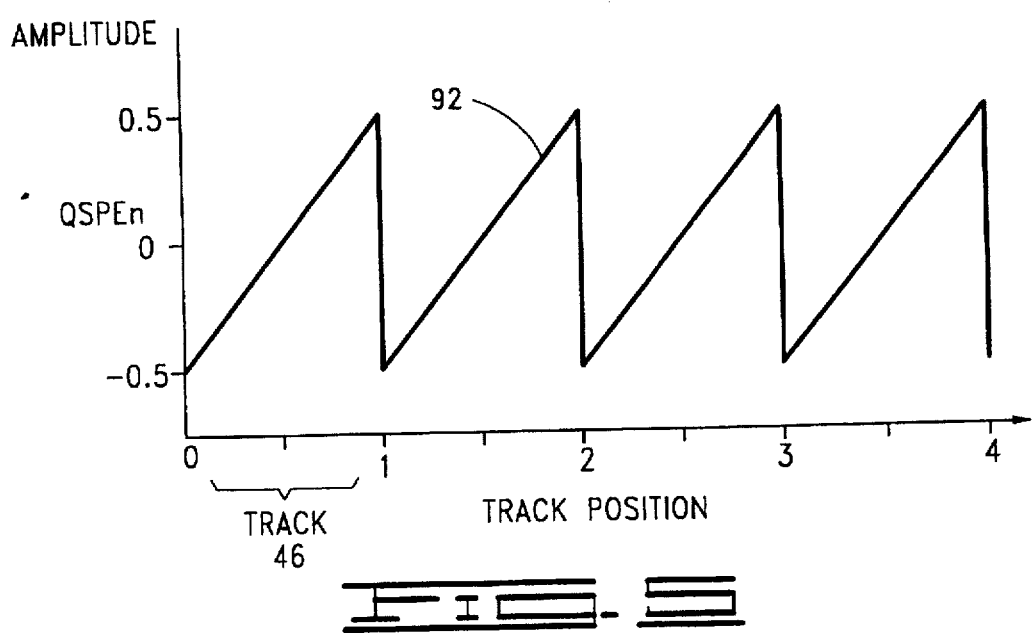
FIG. 5 shows a nominal PES generated from the A, B, C and D burst signals of FIG. 4.

Referring to FIG. 5, shown therein is a nominal PES curve 92 having an amplitude that ranges essentially in a linear fashion from a minimum value of −0.5 to a maximum value of +0.5 as the head is positioned across one track boundary to the next. That is, the PES is shown to have a nominal value of zero when the head is positioned at the center of a track and the PES increases and decreases, respectively, in a linear fashion as the head is positioned toward the track boundaries.

The amplitude and polarity of the PES indicate the relative distance and direction of the position of the head with respect to the track center and can thus be used to generate the appropriate correction signal to move the head to the center of the track. During operation in the servo loop 50 of FIG. 1, the PES is expressed as a sequence of n-bit digital values and, for clarity, these digital values have been represented by the analog values shown on the vertical axis of FIG. 5. However, it will be recognized that other analog values may readily be used to represent the range of the PES digital values.

Figure 6:
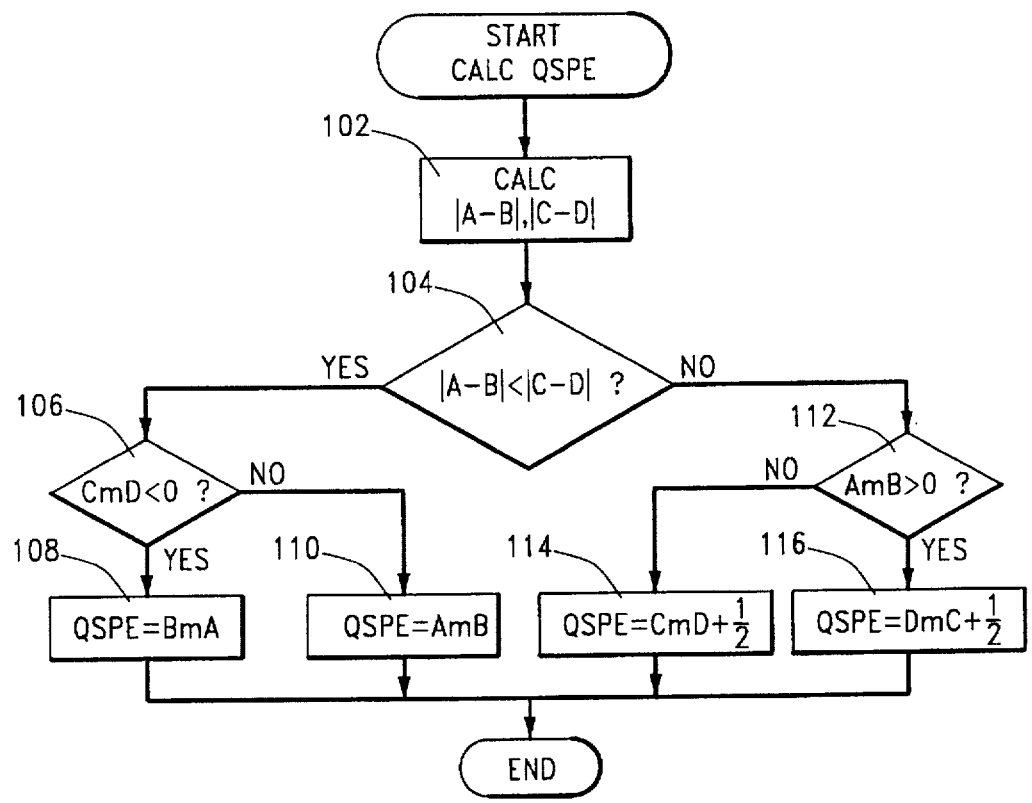
FIG. 6 provides a general flow diagram showing the selection logic used to generate the PES of FIG. 5.

In order to generate the PES curve 92 of FIG. 5 from the AmB, BmA, CmD and DmC phase values, it is necessary to determine whether the track is even or odd and to determine the relative distance of the head from the track center. FIG. 6 provides a general flow diagram showing the corresponding selection logic used to generate the PES. For purposes of clarity, this flow diagram represents programming steps stored in the RAM 64 and executed by the servo microprocessor 58 of FIG. 1 during servo system operation.

Referring to FIG. 6 and with reference back to FIG. 3, the first step is to determine whether the head 32 is closer to the center of a track or closer to a track boundary. This can be found by an evaluation of the relative amplitudes of the A, B, C and D burst signals (as illustrated in FIG. 4) read by the head 32. More particularly, the flow of FIG. 6 begins at block 102 wherein the quantities |A-B| and |C-D| are calculated. It will be recognized that |A-B| will be less than |C-D| when the head 32 is closer to the center of a track than to a track boundary. Decision block 104 thus compares the quantities |A-B| and |C-D|, and when |A-B| is less than |C-D| the flow continues to decision block 106, wherein the polarity of the CmD phase value is evaluated (as CmD will be negative on an odd track and positive on an even track).

Thus, for an odd track the PES value will be the BmA phase value (as indicated by block 108) and for an even track the PES value will be the AmB phase value (as indicated by block 110).

However, when the head 32 is closer to a track boundary than to the center of a track, the decision block 104 will pass the flow to decision block 112, wherein the polarity of AmB is evaluated. As shown, if AmB is positive the PES value will be CmD plus an offset of ½ (block 114) and if AmB is negative the PES value will be DMC plus an offset of ½ (block 116). It will be recognized that the offset values of blocks 114 and 116 are necessary to account for the location of the null point between C and D fields (such as 88 and 90 of FIG. 3) being ½ track away from track center.

Thus, it will be recognized that during servo operation using the PES, the head 32 will encounter the servo frame 70 of FIG. 2 on track 46 and provide signals indicative of the amplitudes of the A, B, C and D burst signals to the servo loop 50. The PES phase values will be calculated in accordance with equations (1)–(4) and the PES will be generated from the phase values in accordance with the flow of FIG. 6. The value of the PES will then be evaluated and a correction signal will be output to the VCM control circuitry 60 in order to modify the current passed through the actuator coil 36 and position the head 32 over the center of the track 46.

Having concluded an overview of the generation of the PES, preferred embodiments of the present invention will now be discussed. It will be recalled that during the generation of the PES a scale factor K is used in the determination of the PES phase values AmB, BmA, CmD and DmC (see equations (1)–(5) above). As provided hereinabove, the scale factor K generally represents the relationship between the width of the head 32 and the width of the corresponding track 46. As the head widths in modern disc drives are typically less than the corresponding track widths, the scale factor K is generally a value less than one. As provided hereinabove, variations in the width of the head and corresponding tracks will lead to inaccurate values of K for a selected head-track combination. Thus, using a nominal value of K for all the tracks 46, 48 on the discs 42, 44 can cause inaccuracies in the determination and use of the PES.

The preferred embodiments of the present invention compensate for these variations by initially determining scale factors at inner and outer diameter locations on the disc during a calibration operation. Thereafter, interpolation techniques are utilized to determine an appropriate scale factor for a selected track from the scale factors determined during the calibration operation.

Figure 7:
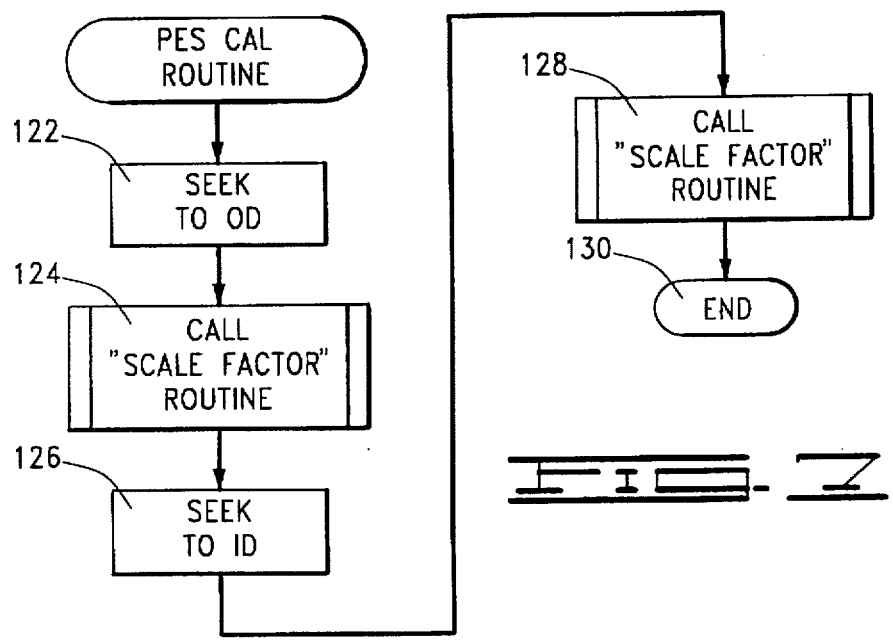
FIG. 7 shows a generalized flow chart for a position error signal calibration routine of the present invention.

Referring now to FIG. 7, shown therein is a generalized flow chart illustrating the steps performed by the preferred embodiments of the present invention. More particularly, FIG. 7 represents the flow of a PES CALIBRATION routine performed by the servo loop 50 at selected intervals, such as during a reset operation of the disc drive 10. The flow of FIG. 7 generally represents programming stored RAM 64 and performed by the servo microprocessor 58 in response to a command received on the signal path 62 from the system microprocessor (not shown) to perform the routine. FIG. 7 shows the PES CALIBRATION routine to begin at a block 122, wherein the servo loop 50 performs a seek to the outer diameter (OD) of the discs 42, 44. More particularly, in the preferred embodiment the tracks on each of the surfaces of the discs 42, 44 are sequentially labeled from 0 to 4096, with track 0 located at the outer diameter of each of the discs 42, 44 and track 4096 located at the inner diameter of each of the discs 42, 44. Thus, the seek of block 122 is performed to track 0 (which for purposes of clarity is not separately shown in the drawings). Of course, it will be recognized that the routine can be performed on any selected track.

The flow of FIG. 7 continues at block 124, wherein a SCALE FACTOR routine is called. This routine is discussed more fully with reference to FIGS. 8 and 9 hereinbelow, which provide alternative embodiments for this routine. Generally, however, the SCALE FACTOR routine operates to identify and store initial scale factors based upon measurements of the servo bursts of FIG. 4. Once the operation of the SCALE FACTOR routine at block 124 is completed, the flow of FIG. 7 continues at block 126, wherein the servo loop 50 performs a seek to the inner diameter (OD) of the discs 42, 44. More particularly, in the preferred embodiment the seek is performed so as to position the heads 32, 34 over the corresponding track 4096 on each of the surfaces of the discs 42, 44. Once so positioned, the flow of FIG. 7 continues at block 128, wherein the SCALE FACTOR routine is again called. Once the routine of block 128 returns from execution, the flow of FIG. 7 ends at block 130.

Figure 8:
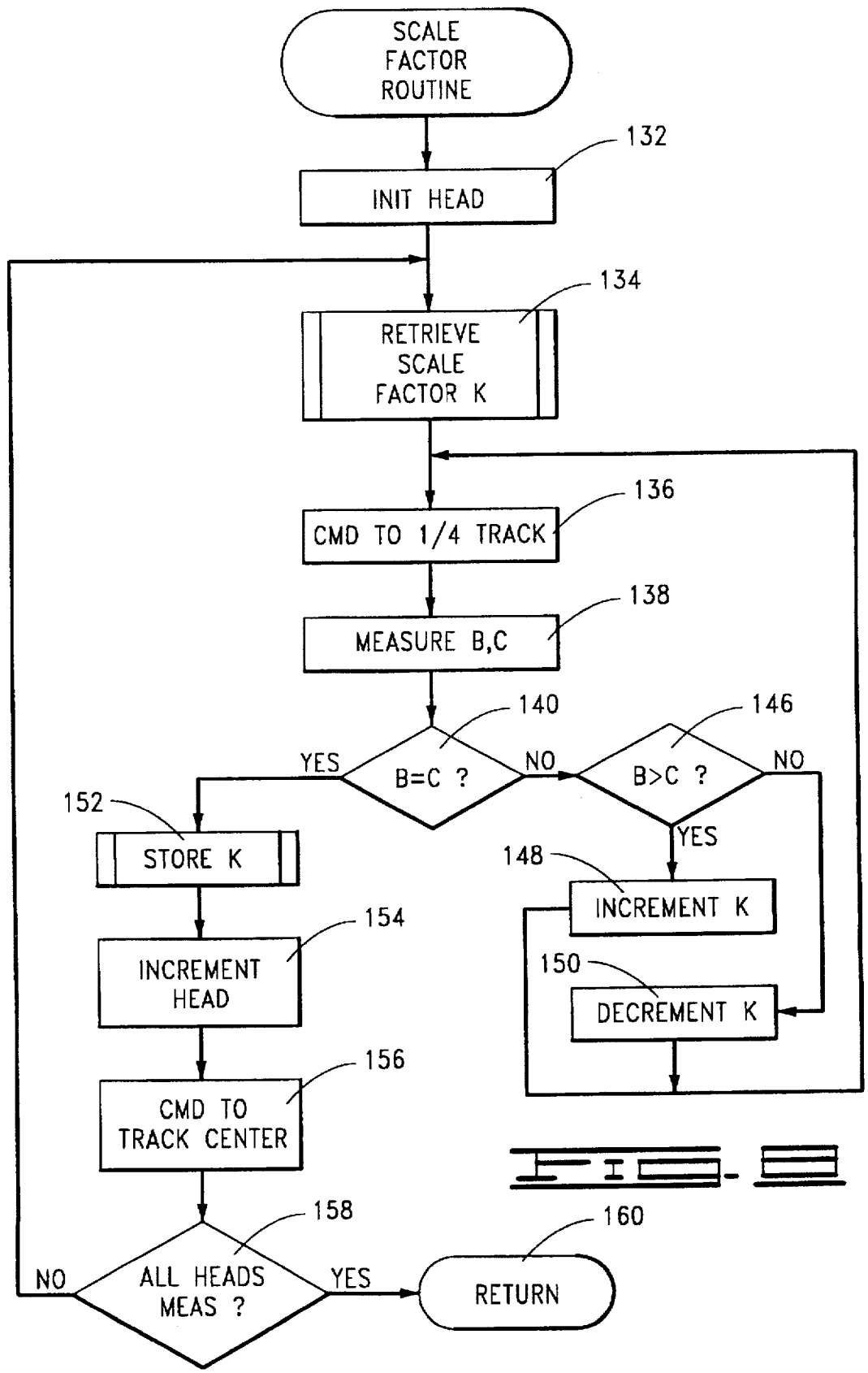
FIG. 8 shows a generalized flow chart for the scale factor routine of FIG. 7.

Referring now to FIG. 8, shown therein is the first embodiment of the SCALE FACTOR routine of blocks 124 and 128 of FIG. 7. The SCALE FACTOR routine of FIG. 8, like the PES CALIBRATION routine of FIG. 7, represents programming stored in RAM 64 and executed by the servo microprocessor 58. Particularly, the flow of FIG. 8 begins at an INIT HEAD step a block 132, wherein the first head is selected for calibration of the PES. As provided hereinabove, the present invention is not dependent upon the type of servo system used, but contemplates that at least one surface of the discs 42, 44 will include the servo information of FIG. 2. Thus, in a dedicated servo system, the servo head or heads will be selected for calibration during the flow of FIG. 8, whereas in an embedded servo system, all of the heads will be selected in turn for calibration during the flow of FIG. 8. In either case, the first head is selected at block 132, and for purposes of discussion hereinbelow, the head 32 of FIG. 1 will be considered to be the first head selected.

The flow of FIG. 8 continues to block 134, wherein a corresponding scale factor for the head 32 is retrieved from memory for the associated track location (track 0 or 4096, accordingly). The retrieved scale factor is preferably a value that was previously stored as a result of prior operation of the flow of FIG. 8 for the head 32 and the associated track location, although the retrieved scale factor can be a constant value that is subsequently retrieved every time block 134 of FIG. 8 is executed.

FIG. 8 continues at block 136, wherein the servo microprocessor 58 outputs a correction signal to the VCM control circuitry 60 to position the head 32 one-quarter (¼) of a track width away from the center of the track (this is also referred to as a "¼ track location"). This correction signal is generated from the PES, which in turn is generated using the scale factor retrieved in block 134. The head 32 is preferably instructed to move in a direction so as to increase the magnitude of the B burst signal until the head 32 is positioned between the center of the track and a track boundary (that is, with reference to FIG. 3 and using track 46 shown therein as an example, the head 32 is instructed to move in a direction towards track boundary 1). At such time that the head is positioned by the operation of block 136 at the ¼ track location, the flow of FIG. 8 proceeds to block 138, wherein the magnitudes of the B and C burst signals are measured.

Next, the magnitudes of the B and C burst signals are compared in decision block 140. With reference back to FIG. 4, the magnitudes of the B and C burst signals will nominally be equal when the head 32 is positioned over the ¼ track location (which for purposes of clarity has been indicated at mark 144 in FIG. 4 for track 46 shown therein). Further, it will be recognized from FIG. 4 that, as the head 32 moves away from the ¼ track location and towards the closest track boundary (such as track boundary 1), the B burst signal will generally increase in magnitude whereas the C burst signal will generally decrease in magnitude.

Thus, at such time that the magnitudes of the B and C burst signals are not found to be equal (within a selected measurement interval) in decision block 140, the flow of FIG. 8 continues to decision block 146, which tests whether the magnitude of the B burst signal is greater than the magnitude of the C burst signal. If so, the head 32 is closer to the track boundary than the center of the track and the flow thus passes to block 148 wherein the scale factor K is incremented by a selected amount. On the other hand, when the magnitude of the B burst signal is not greater than the magnitude of the C burst signal, then the flow passes from the decision block 146 to block 150, wherein the scale factor K is decremented by a selected amount. For purposes of clarity, the general term "incremented" with reference to the scale factor K will be hereinafter considered to include both the incrementing and the decrementing of the scale factor K by the operation of the blocks 148 and 150.

Once the scale factor has been incremented, the flow of FIG. 8 returns back to block 136, wherein the operation of blocks 136 to 140 are again performed, using the incremented scale factor K. That is, the head 32 is commanded to move to the ¼ track location using the incremented scale factor K and the magnitudes of the B and C burst signals are again measured and compared.

At such time that the magnitudes of the B and C burst signals are found to be nominally equal by decision block 140, the flow of FIG. 8 passes to block 152, wherein the value of the scale factor K is stored. The next head to be tested is then selected in the INCREMENT HEAD block 154, and this head is positioned over the center of the corresponding calibration track (0 or 4096), as shown by block 156. The flow then passes to decision block 158, which queries whether all the heads which read servo information have been measured. If not, then the flow of FIG. 8 returns to block 134 and the previously described operations are repeated on each successive head until all of the heads have been measured, after which the SCALE FACTOR routine returns at block 160. Thus, at the conclusion of the SCALE FACTOR routine of FIG. 8, a scale factor K will have been identified as stored for each of the tested heads, for the associated track on the disc (i.e., in the preferred embodiment, track 0 or track 4096, respectively).

As provided hereinabove, a similar, alternative embodiment for the SCALE FACTOR routine of FIG. 8 is disclosed herein and this alternative embodiment is shown with reference to FIG. 9. That is, FIG. 9 provides an alternative SCALE FACTOR routine to the SCALE FACTOR routine described with reference to FIG. 8 and it will be recognized that both routines operate to identify and store scale factors K for each of the tested heads.

Referring to FIG. 9, the flow begins at block 162, wherein the first head to be tested is initialized. As with the discussion of FIG. 8, the head 32 will be considered to be the first head tested in FIG. 9. Once the head 32 has been selected, the flow of FIG. 9 continues to block 164, wherein a scale factor K is retrieved from memory. As with the operation of block 134 in FIG. 8, the scale factor K retrieved by block 164 can be a previously stored scale factor K obtained from the previous operation of the routine of FIG. 9, or can be a constant value which is retrieved each time the routine of FIG. 9 is executed.

Using the scale factor K retrieved in block 164, the head 32 is next positioned over track center, as shown by block 166. Once the head 32 is so positioned, a command is issued to sweep the head towards the track boundary (corresponding to the track boundary 1 for track 46 in FIG. 4) by block 168 until the magnitudes of the B and C burst signals are measured and compared as the head 32 is moved away from the track center towards the ¼ track location.

At such time that the magnitudes of the B and C burst signals are nominally equal, block 170 operates to determine a value identified as $PES_A$ ("PES Actual") in accordance with the following relationship:

$$PES_A = \frac{(A-B)}{(A+B)} \quad (6)$$

Next, the flow of FIG. 9 continues at block 172 to retrieve a second PES value identified as $PES_E$ ("PES Expected") from memory. The $PES_E$ value is the expected value of PES when the head 32 is located exactly at the ¼ track location; for reference, using the scaling shown in FIG. 5, the $PES_E$ will comprise an analog value of 0.25. Once the $PES_E$ value is retrieved in block 172, the scale factor K is determined from the ratio:

$$K = \frac{PES_E}{PES_A} \quad (7)$$

as shown in block 174. That is, once the head 32 has been positioned such that the magnitudes of the B and C burst signals are nominally equal, the head 32 is known to be at the ¼ track location. The scale factor K can therefore be determined from the ratio of the $PES_E$ (expected PES value) and the $PES_A$ (actual PES value), as provided in equation (7) hereinabove (and block 174 of FIG. 9).

Once the value of the scale factor K has been determined, the flow continues to block 176 wherein the scale factor K is stored. Thereafter, the next head to be tested is selected by the INCREMENT HEAD block 178 and, as with the routine of FIG. 8, the routine of FIG. 9 continues at decision block 180 until all the heads which read servo information have been tested, after which the routine returns at block 182.

It will be recognized that the PES CAL routine of FIG. 7 operates to perform the SCALE FACTOR routine (whether as embodied in FIG. 8 or FIG. 9) at calibration tracks at the outer diameter (tracks 0) and then at the inner diameter (tracks 4096). In each case, a scale factor is stored for each head reading servo information from the discs 42, 44. It will further be recognized that the SCALE FACTOR routine of FIG. 8 will generally take longer to perform than the SCALE FACTOR routine of FIG. 9, as the routine of FIG. 8 generally iterates to a solution over several passes while the routine of FIG. 9 generally determines the solution using one pass. However, the routine of FIG. 8 may generally provide a more robust solution as the effects of, for example measurement errors, are generally averaged out over the corresponding number of iterations.

Once the scale factors have been determined for each of the heads for tracks at the inner and outer diameters, subsequent operation of the servo loop 50 in controlling the position of the heads 32, 34 during track following is performed in conjunction with a DETERMINE $K_T$ routine, as generally illustrated in FIG. 10. That is, at such time that the servo loop 50 is to determine the PES for a selected track, the corresponding scale factor $K_T$ is identified by the routine of FIG. 10, based upon the radial location of the selected track.

Referring to FIG. 10, the DETERMINE $K_T$ routine begins at block 184, wherein the selected track location is identified, as well as the previously stored scale factors K for the calibration tracks at the inner and outer diameters (ID and OD) for the selected head. (That is, the previously stored scale factors K for the calibration tracks (0 and 4096) on the same disc surface as the selected track are retrieved.)

Next, the flow continues at block 186, wherein the scale factor identified $K_T$ (for the selected track) is determined using well known interpolation techniques between the previously determined scale factors at the ID and OD. More particularly, in the preferred embodiment, a linear relationship is determined between the scale factors and the OD and ID calibration tracks, and the scale factor $K_T$ is determined accordingly therefrom, based upon the relative distance between the selected track and the ID and OD calibration tracks. Such interpolation techniques are well known in the art and can comprise the calculation of the scale factor $K_T$, or the generation of a look-up table containing the scale factor for each of the tracks on the discs. Additionally, other non-linear interpolation techniques, such as exponential interpolation techniques, may be readily employed.

Once the value of the scale factor $K_T$ has been determined, the PES is then determined as before, as indicated at block 188 of FIG. 10 and the servo loop 50 then operates in accordance with the foregoing description to control the position of the heads 32, 34 with respect to the discs 42, 44.

Although for purposes of disclosure only two calibration tracks (0 and 4096) have been described, it will be recognized that any number of calibration tracks can be used, as desired, including one track per zone in disc drives employing the use of zone based recording, such as disclosed in U.S. Pat. No. 4,799,112 entitled METHOD AND APPARATUS FOR RECORDING DATA, issued Jan. 17, 1989 to Bremmer et al., assigned to the assignee of the present invention and incorporated herein by reference. Further, although preferred embodiments of the present invention have examined the magnitude of the B and C burst patterns, it will be apparent that other combinations of burst patterns may be used in practicing the present invention, including the use of A and C, A and D and B and D burst patterns.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type including a disc and an actuator adjacent the disc, the actuator having a head and an actuator coil, the disc having a surface including a plurality of nominally concentric tracks and servo position fields read by the head to provide burst signals, the magnitude of the burst signals used to generate a position error signal indicative of the relative position of the head with respect to the tracks, the disc drive further including servo loop circuitry for applying current to the actuator coil to position the head with respect to the disc surface in response to the position error signal, each servo position field including a first burst pattern extending radially from a first boundary to a second boundary of a calibration track, a second burst pattern extending radially from the center of the calibration track to the first track boundary and a third burst pattern extending radially from the center of the calibration track to the second track boundary, a method for calibrating the position error signal, comprising the steps of:

13 positioning the head over the center of the calibration track;

moving the head to a quarter-track location, the quarter-track location comprising a position over the calibration track between the center of the calibration track and a selected one of the first and second boundaries of the calibration track, such that the magnitude of the burst signal from the first burst pattern is nominally equal to the magnitude of the burst signal from a selected one of the second and third burst patterns;

determining a scale factor from the burst signals at the quarter-track location; and, thereafter, using the scale factor to generate the position error signal in order to position the head with respect to a selected track on the disc;

wherein the step of determining a scale factor from the burst signals at the quarter-track location comprises the steps of:

identifying an expected value of the position error signal at the quarter-track location;

determining an actual value of the position error signal at the quarter-track location; and determining the scale factor from the ratio of the expected value and the actual value of the position error signal at the quarter-track location.

2. The method of claim 1, wherein the calibration track comprises a first calibration track at a location towards an outer radius of the disc so that the scale factor is determined at a first calibration scale factor, wherein a second calibration scale factor is determined for a second calibration track located towards an inner radius of the disc, and wherein the scale factor for a selected track is thereafter determined from the first and second calibration scale factors.

3. In a disc drive of the type including a disc and an actuator adjacent the disc, the actuator having a head and an actuator coil, the disc having a surface including a plurality of nominally concentric tracks and servo position fields read by the head to provide burst signals, the magnitude of the burst signals used to generate a position error signal indicative of the relative position of the head with respect to the tracks, the disc drive further including servo loop circuitry for applying current to the actuator coil to position the head with respect to the disc surface in response to the position error signal, each servo position field including a first burst pattern extending radially from a first boundary to a second boundary of a calibration track, a second burst pattern extending radially from the center of the calibration track to the first track boundary and a third burst pattern extending radially from the center of the calibration track to the second track boundary, a method for calibrating the position error signal, comprising the steps of:

positioning the head over the center of the calibration track;

determining a nominal position error signal using a nominal scale factor;

using the nominal position error signal to position the head to a location towards the quarter-track location, the quarter-track location comprising a position over the calibration track between the center of the calibration track and a selected one of the first and second boundaries of the calibration track, such that the magnitude of the burst signal from the first burst pattern is nominally equal to the magnitude of the burst signal from a selected one of the second and third burst patterns;

14 incrementing the nominal scale factor and repositioning the head until the head is located over the quarter-track location;

determining a scale factor from the burst signals at the quarter-track location;

selecting the scale factor as the incremented nominal scale factor; and, thereafter;

using the scale factor to generate the position error signal in order to position the head with respect to a selected track on the disc.

4. A method for calibrating a position error signal in a disc drive, the disc drive having a disc and a controllably positionable actuator adjacent the disc, the actuator having a head and an actuator coil, the disc having a surface including a plurality of nominally concentric tracks and servo position fields read by the head to provide burst signals, the magnitude of the burst signals used in the generation of the position error signal, the position error signal being indicative of the relative position of the head with respect to the tracks, the disc drive further including servo loop circuitry for applying current to the actuator coil to position the head with respect to the disc surface in response to the position error signal, each servo position field including a first burst pattern extending radially from a first boundary to a second boundary of a calibration track, a second burst pattern extending radially from the center of the calibration track to the first track boundary and a third burst pattern extending radially from the center of the calibration track to the second track boundary, the method comprising the steps of:

positioning the head over the center of the calibration track;

sweeping the head towards a selected one of the first and second boundaries of the calibration track until the magnitude of the first burst pattern is nominally equal to the magnitude of the burst signal from a selected one of the second and third burst patterns;

determining an actual position error signal from the magnitudes of the first burst pattern and the selected one of the second and third burst patterns;

providing an expected position error signal, the expected position error signal indicative of the nominal value of the position error signal expected at the location where the magnitude of the first burst pattern and the selected one of the second and third burst patterns are nominally equal;

determining a scale factor from the ratio of the actual position error signal and the expected position error signal; and thereafter, using the scale factor to generate the position error signal for a selected track on the disc.

5. The method of claim 4, wherein the calibration track comprises a first calibration track at a location towards an outer radius of the disc so that the scale factor is determined as a first calibration scale factor, wherein a second calibration scale factor is determined for a second calibration track located towards an inner radius of the disc, and wherein the scale factor for the selected track is thereafter interpolated using the first and second calibration scale factors.

6. A method for calibrating a position error signal in a disc drive, the disc drive having a disc and a controllably positionable actuator adjacent the disc, the actuator having a head and an actuator coil, the disc having a surface including a plurality of nominally concentric tracks and servo position fields read by the head to provide burst signals, the magnitude of the burst signals used in the generation of the position error signal, the position error signal being indicative of the relative position of the head with respect to the tracks, the disc drive further including servo loop circuitry for applying current to the actuator coil to position the head with respect to the disc surface in response to the position error signal, each servo position field including a first burst pattern extending radially from a first boundary to a second boundary of a calibration track, a second burst pattern extending radially from the center of the calibration track to the first track boundary and a third burst pattern extending radially from the center of the calibration track to the second track boundary, the method comprising the steps of:

(a) positioning the head over the center of the calibration track;

(b) retrieving a scale factor;

(c) using the scale factor to generate a position error signal;

(d) using the position error signal to position the head at a quarter-track location, the quarter-track location comprising a position over the calibration track between the center of the calibration track and a selected one of the first and second boundaries of the calibration track;

(e) comparing the magnitude of the burst signal from the first burst pattern to the magnitude of the burst signal from a selected one of the second and third burst patterns;

(f) incrementing the scale factor and repeating steps (c)–(e) until the magnitude of the burst signal from the first burst pattern is nominally equal to the magnitude of the burst signal from the selected one of the second and third burst patterns;

(g) storing the incremented scale factor; and thereafter;

(h) using the incremented scale factor to generate the position error signal for a selected track.

7. The method of claim 6, wherein the calibration track comprises a first calibration track at a location towards an outer radius of the disc so that the incremented scale factor is determined as a first calibration scale factor, wherein steps (a)–(g) are repeated to determine a second calibration scale factor for a second calibration track located towards an inner radius of the disc, and wherein step (h) comprises the steps of:

determining a scale factor for the selected track using the first and second calibration scale factors; and determining the position error signal using the scale factor for the selected track.

* * * * *